United States Patent
Chen et al.

(10) Patent No.: US 12,253,619 B2
(45) Date of Patent: Mar. 18, 2025

(54) METHOD AND APPARATUS FOR DETERMINING TIME OF ARRIVAL, SIGNAL RECEIVING DEVICE, AND STORAGE MEDIUM

(71) Applicant: ZTE CORPORATION, Shenzhen (CN)

(72) Inventors: Shijun Chen, Shenzhen (CN); Dawei Chen, Shenzhen (CN); Junqiang Li, Shenzhen (CN); Yang Wang, Shenzhen (CN); Qian Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 462 days.

(21) Appl. No.: 17/785,625

(22) PCT Filed: Dec. 23, 2020

(86) PCT No.: PCT/CN2020/138462
§ 371 (c)(1),
(2) Date: Jun. 15, 2022

(87) PCT Pub. No.: WO2021/196764
PCT Pub. Date: Oct. 7, 2021

(65) Prior Publication Data
US 2023/0029291 A1 Jan. 26, 2023

(30) Foreign Application Priority Data
Apr. 1, 2020 (CN) .......................... 202010251397.7

(51) Int. Cl.
*G01S 5/06* (2006.01)
*G01S 5/02* (2010.01)

(52) U.S. Cl.
CPC .............. *G01S 5/06* (2013.01); *G01S 5/0218* (2020.05)

(58) Field of Classification Search
CPC ................................ G01S 5/06; G01S 5/0218
See application file for complete search history.

(56) References Cited

U.S. PATENT DOCUMENTS

| 10,880,678 | B1 * | 12/2020 | Chrabieh | H04L 27/2647 |
| 2007/0184783 | A1 * | 8/2007 | Rosenfeld | G01S 5/10 455/67.11 |

(Continued)

FOREIGN PATENT DOCUMENTS

| CN | 104237740 A | 12/2014 |
| CN | 110346755 A | 10/2019 |

(Continued)

OTHER PUBLICATIONS

International Searching Authority. International Search Report and Written Opinion for PCT Application No. PCT/CN2020/138462 and English translation, mailed Mar. 30, 2021, pp. 1-11.

(Continued)

*Primary Examiner* — Cassi J Galt
(74) *Attorney, Agent, or Firm* — Vivacqua Crane, PLLC

(57) ABSTRACT

Disclosed are a method and an apparatus for determining time of arrival, a signal receiving device, and a non-transitory computer readable storage medium. The method for determining time of arrival includes: generating time of arrival correction information according to front edge information of theoretical autocorrelation waveforms of positioning signals having different fading values; calculating a front edge slope corresponding to a front edge reference point of a correlation waveform of an actually received signal; and determining target correction information from the time of arrival correction information according to the front edge slope, and determining the time of arrival of the actually received signal based on the target correction information.

14 Claims, 5 Drawing Sheets

(56) References Cited

U.S. PATENT DOCUMENTS

| | | | |
|---|---|---|---|
| 2008/0032708 | A1 | 2/2008 | Guvenc et al. |
| 2009/0058729 | A1 | 3/2009 | Jo |
| 2009/0149132 | A1 | 6/2009 | LeFever et al. |
| 2015/0094086 | A1 | 4/2015 | Hedley |

FOREIGN PATENT DOCUMENTS

| | | | |
|---|---|---|---|
| CN | 110346756 | A | 10/2019 |
| CN | 111901743 | A | 11/2020 |
| WO | 2012128779 | A1 | 9/2012 |
| WO | 2018208730 | A1 | 11/2018 |

OTHER PUBLICATIONS

Intellectual Property India. Examination Report for IN Application No. 202227038193 and English translation, mailed Nov. 25, 2022, pp. 1-6.

European Patent Office. Extended European Search Report for EP Application No. 20928105.4, mailed Apr. 9, 2024, pp. 1-7.

\* cited by examiner

METHOD AND APPARATUS FOR DETERMINING TIME OF ARRIVAL, SIGNAL RECEIVING DEVICE, AND STORAGE MEDIUM

CROSS-REFERENCE TO RELATED APPLICATION

This application is a national stage filing under 35 U.S.C. § 371 of international application number PCT/CN2020/138462, filed Dec. 23, 2020 which claims priority to Chinese patent application No. 202010251397.7, filed Apr. 1, 2020. The contents of these applications are incorporated herein by reference in their entirety.

TECHNICAL FIELD

The present disclosure relates to the field of wireless communication systems, for example, to a method and an apparatus for determining time of arrival, a signal receiving device, and a non-transitory computer readable storage medium.

BACKGROUND

In wireless communication systems, a time difference of arrival (TDOA) positioning method is generally used for high-precision positioning of a device in a communication network, that is, a distance between a sender and a receiver is determined by measuring the time when a signal arrives at the receiver, and according to distances from a signal source to various receivers, the position of the signal source can be determined. The TDOA positioning method mainly includes: determining a frame header and defining orthogonal frequency division multiplexing (OFDM) symbols. Starting from a defined time point, a fixed number of sampling points are removed according to a prefix length to obtain time domain data for the symbols. Then, a mathematical sequence correlation operation is performed, and the first maximum correlation peak is taken as the time of arrival of a signal. The detection of TOA is usually based on a theoretical autocorrelation triangular waveform of a signal. However, as the communication network environment becomes more and more complex and changeable, for example, in environments with complex multipaths, such as indoors and dense urban areas, due to the influence of noise and multipaths, the slope of a signal correlation waveform is distorted, which is no longer an ideal triangular waveform. Therefore, there is a very large error in a slope-based detection method. In practical applications, the bandwidth is limited, and in the case where the bandwidth is strictly limited, the autocorrelation waveform is no longer a strict triangular waveform. This situation, together with a multipath situation, makes the signal correlation waveform more complicated, such that the precision and reliability of the slope-based detection method are relatively low.

SUMMARY

Embodiments of the present disclosure provide a method and an apparatus for determining time of arrival, a signal receiving device and a non-transitory storage medium, to improve the precision and reliability of detection of the time of arrival.

According to an embodiment of the present disclosure, provided is a method for determining time of arrival. The method includes:

generating time of arrival correction information according to front edge information of theoretical autocorrelation waveforms of positioning signals having different fading values; calculating a front edge slope corresponding to a front edge reference point of a correlation waveform of an actually received signal; and determining target correction information from the time of arrival correction information according to the front edge slope, and determining the time of arrival of the actually received signal based on the target correction information.

According to another embodiment of the present disclosure further provided is an apparatus for determining time of arrival. The apparatus includes:

a correction information generation module configured to generate time of arrival correction information according to front edge information of theoretical autocorrelation waveforms of positioning signals having different fading values; a front edge slope calculation module configured to calculate a front edge slope corresponding to a front edge reference point of a correlation waveform of an actually received signal; and a time of arrival determination module configured to determine target correction information from the time of arrival correction information according to the front edge slope, and determine the time of arrival of the actually received signal based on the target correction information.

According to another embodiment of the present disclosure further provided is a signal receiving device. The signal receiving device includes:

one or more processors; and a storage means configured to store one or more programs which, when executed by the one or more processors, cause the one or more processors to carry out the method for determining time of arrival described above.

According to another embodiment of the present disclosure further provided is a computer-readable non-transitory storage medium storing computer programs which, when executed by a processor, cause the processor to carry out the method for determining time of arrival described above.

DETAILED DESCRIPTION

The present disclosure will be described below in conjunction with the accompanying drawings and embodiments.

When locating a device in a wireless communication network, it is necessary to detect time of arrival of a signal.

The detection of the time of arrival is usually based on slope detection of a theoretical autocorrelation triangular waveform of the signal. For example, a time for the first maximum correlation peak is taken as the time of arrival of the signal. However, as the communication network environment becomes more and more complex and changeable, for example, in environments with complex multipaths, such as indoors and dense urban areas, due to the influence of noise and multipaths, the slope of a signal correlation waveform is often distorted.

Figure 1:
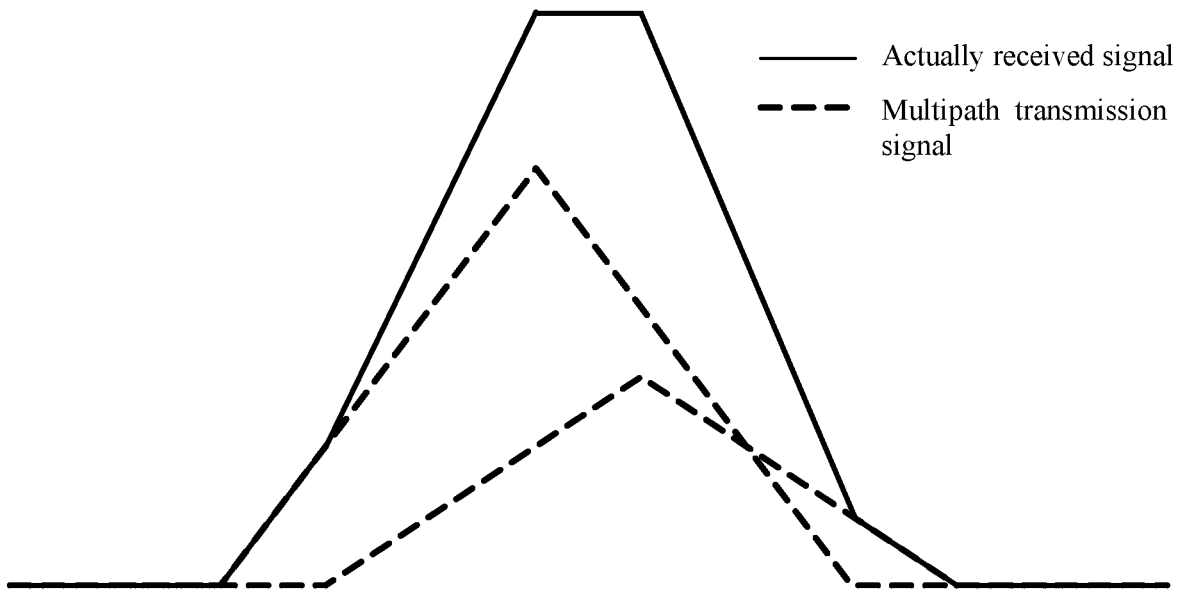
FIG. 1 is a schematic diagram of an actually received signal in multipath transmission.

FIG. 1 is a schematic diagram of an actually received signal in multipath transmission. In FIG. 1, the multipath transmission of a signal is taken as an example, in which dotted lines represent results of multipath transmission of the signal, and a solid line represents a waveform of a signal actually received by a receiving end. The correlation waveform of the actually received signal is obviously not an ideal triangular waveform, so the method based on slope detection to determine the time of arrival of the signal has a very large error. Even for a single-path signal, the slope detection method may have a large error due to an unstable channel quality and an influence of other noise or a bandwidth limitation, which makes it impossible to achieve high-precision measurement of the time of arrival in a complex wireless environment and under a bandwidth limitation.

In this embodiment, with regard to a situation where the precision of measuring time of arrival based on a slope is low in a complex and changeable network environment, time of arrival correction information is generated according to theoretical autocorrelation waveforms of positioning signals, and the moments for some front edge positions of an actually received signal are corrected according to theoretical time of arrival correction information. In this way, in a multipath or noise environment, details of front edge change of a correlation waveform of the actually received signal can be noticed, so that the detection result of the front edge slope of the actually received signal is closer to a theoretical waveform, thereby improving the precision and reliability of the time of arrival detection.

Figure 2:
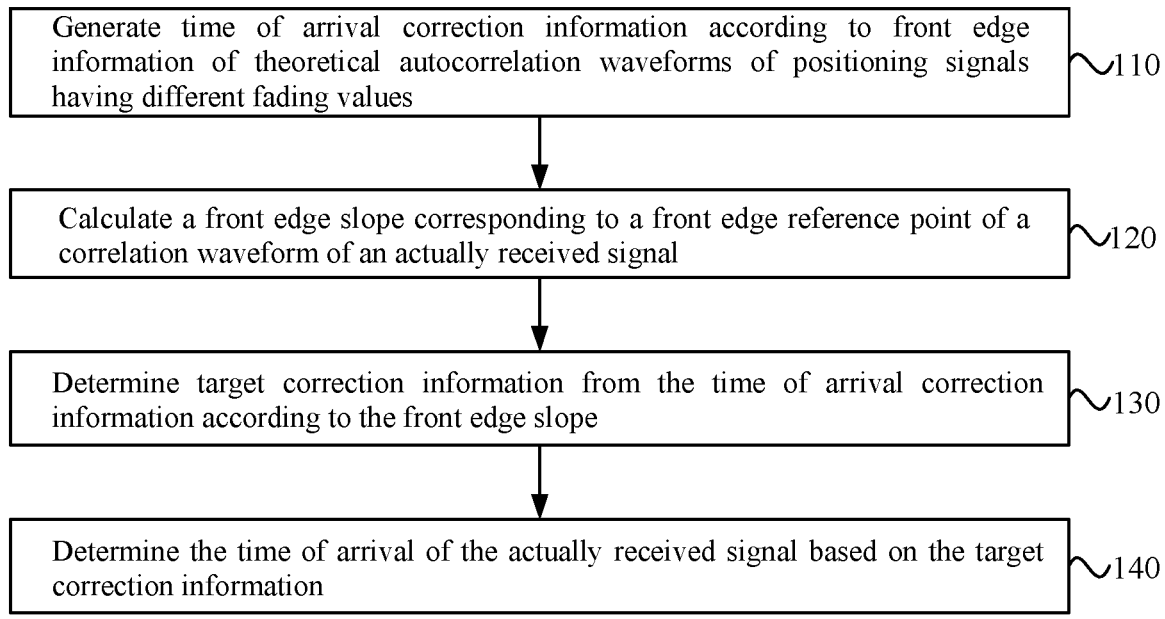
FIG. 2 is a flowchart of a method for determining time of arrival provided by an embodiment.

FIG. 2 is a flowchart of a method for determining time of arrival provided by an embodiment. As shown in FIG. 2, the method provided in this embodiment includes steps S110 to S140.

At S110, time of arrival correction information is generated according to front edge information of theoretical autocorrelation waveforms of positioning signals having different fading values.

At S120, a front edge slope corresponding to a front edge reference point of a correlation waveform of an actually received signal is calculated.

At S130, target correction information is determined from the time of arrival correction information according to the front edge slope.

At S140, the time of arrival of the actually received signal is determined based on the target correction information.

In this embodiment, the time of arrival correction information is generated with the front edge information of the theoretical autocorrelation waveforms of the positioning signals. There may be multiple theoretical autocorrelation waveforms of the positioning signals, which respectively correspond to different fading values. For example, according to a certain rule, the theoretical autocorrelation waveforms of the positioning signals corresponding to different fading values are divided into several segments, and several reference points on the front edges of the theoretical autocorrelation waves can be determined according to the division results. Time of arrival correction information can be generated according to the moments corresponding to the reference points. The time of arrival correction information may be stored in the form of a table. Each entry of the time of arrival correction information corresponds to a reference point, which records the front edge information of the reference point. The front edge information may include the slope, the moment, etc. The time of arrival correction information generated according to the theoretical autocorrelation waveforms accords with a transmission result of a signal in an ideal state.

Since the slope of the actually received signal has been distorted, the slopes corresponding to the various corresponding positions of the reference points may be different, and the corresponding moments are also inaccurate. Therefore, it is inaccurate to determine the time of arrival by slope detection. In this embodiment, according to a front edge slope at a front edge reference point of the actually received signal, target correction information at a position corresponding to the front edge reference point is found in the time of arrival correction information, by which the moment of the front edge reference point of the actually received signal is corrected. On this basis, the earliest moment in the corresponding corrected moments of the front edge reference points (which may also be a moment average obtained through a mathematical statistical operation based on several earliest moments or a class of earliest moments, etc.) can be taken as the time of arrival, thereby reducing the error in detecting the time of arrival of the actually received signal based on the slope.

In an embodiment, according to a certain rule, the fading values of the positioning signals can be divided into several different values, so as to obtain positioning signals corresponding to different fading values. For example, if the positioning signals are normalized, the maximum fading value is 1. The fading values are divided into 3 types. Taking trisection of the fading values as an example, the fading values of the positioning signals are 1, ⅔, ⅓ respectively, so that theoretical autocorrelation waveforms of three positioning signals are obtained. The theoretical autocorrelation waveform of each positioning signal may also be divided into several segments according to a certain rule, so as to determine several reference points of the front edge. Time of arrival correction information is generated according to the slope and the moment corresponding to each reference point. The correlation waveform of an actually received signal may be divided into several segments according to the same rule to obtain several corresponding front edge reference points. According to the front edge slope of each front edge reference point, an entry closest to the front edge slope is determined from the time of arrival correction information, which is the target correction information corresponding to the front reference point. In some embodiments, the theoretical autocorrelation waveforms of the positioning signals are normalized according to moduli or the fading values, and the correlation waveform of the actually received signal is normalized according to a modulus, thereby facilitating selection of reference points and reducing the amount of calculation.

In the method for determining time of arrival of this embodiment, time of arrival correction information is generated according to theoretical autocorrelation waveforms of positioning signals, and a front edge reference point of an actually received signal is corrected according to theoretical time of arrival correction information, and the time of arrival is determined based on corrected data of a correlation waveform of the actually received signal. In this way, in a multipath or noise environment, details of front edge change of a correlation waveform of the actually received signal can be noticed, so that the detection result of the front edge slope of the actually received signal is closer to a theoretical waveform, thereby improving the precision and reliability of the time of arrival detection.

Figure 3:
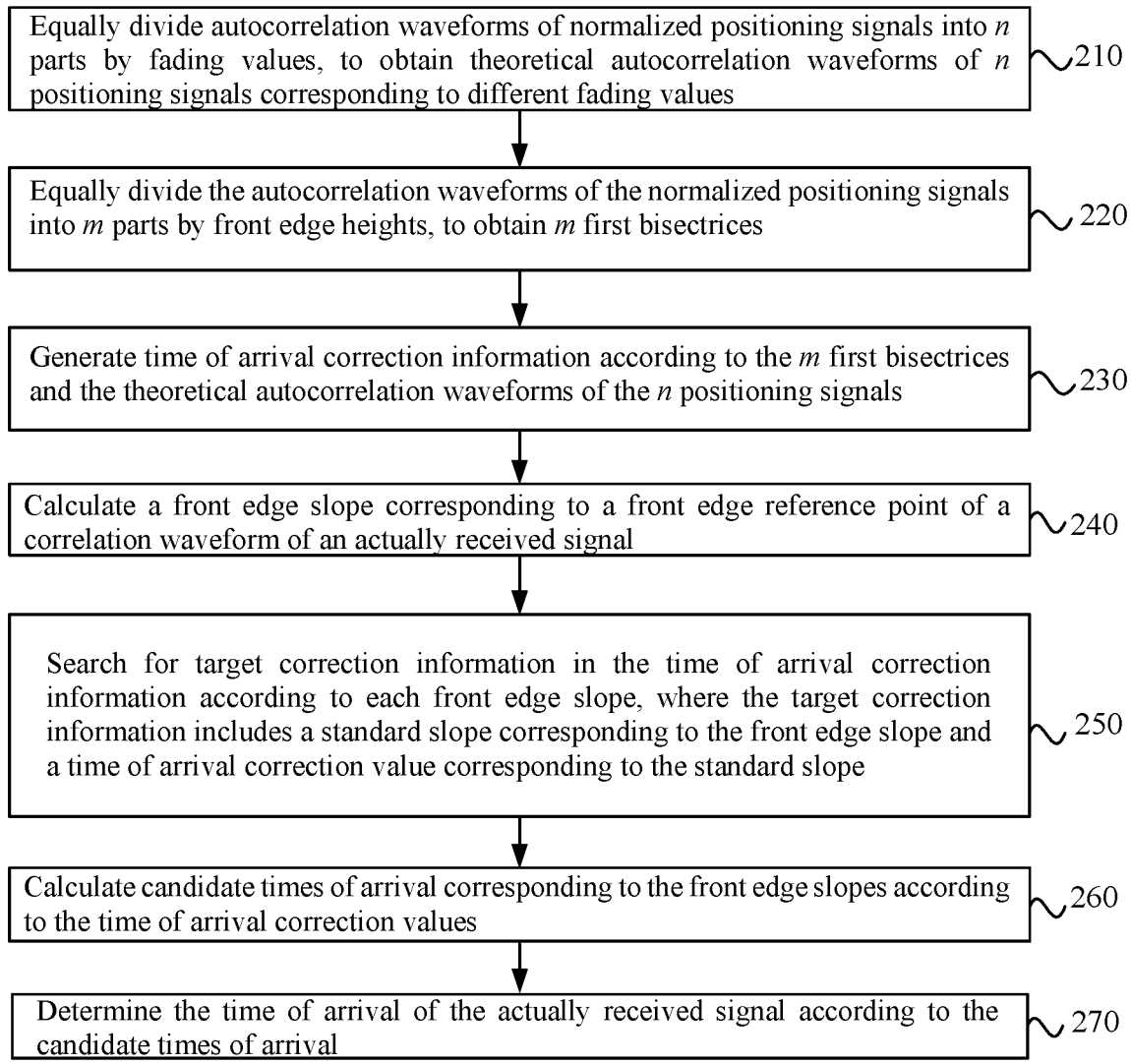
FIG. 3 is a flowchart of another method for determining time of arrival provided by an embodiment.

FIG. 3 is a flowchart of another method for determining time of arrival provided by an embodiment. As shown in FIG. 3, the method provided in this embodiment includes steps S210 to S270.

At S210, fading values of autocorrelation waveforms of normalized positioning signals are equally divided into n parts to obtain theoretical autocorrelation waveforms of n positioning signals corresponding to different fading values.

At S220, the front edge heights of the autocorrelation waveforms of the normalized positioning signals are equally divided into m parts to obtain m first bisectrices.

At S230, time of arrival correction information is generated according to them first bisectrices and the theoretical autocorrelation waveforms of the n positioning signals.

In this embodiment, the positioning signals are normalized according to the moduli, that is, the maximum modulus is 1. Equally dividing the fading values of the autocorrelation waveforms of the normalized positioning signals into n parts refers to dividing the autocorrelation waveforms of the normalized positioning signals into n types, which are sequentially as follows: the maximum modulus of an autocorrelation function is 1, the maximum modulus of an autocorrelation function is (n−1)/n, . . . , and the maximum modulus of an autocorrelation function is 1/n. There are a total of n positioning signals corresponding to different fading values. In addition, the front edge heights of the autocorrelation waveforms of the normalized positioning signals are equally divided into m parts from 0 to 1 to obtain m first bisectrices, and the height of each part is 1/m.

Figure 4:
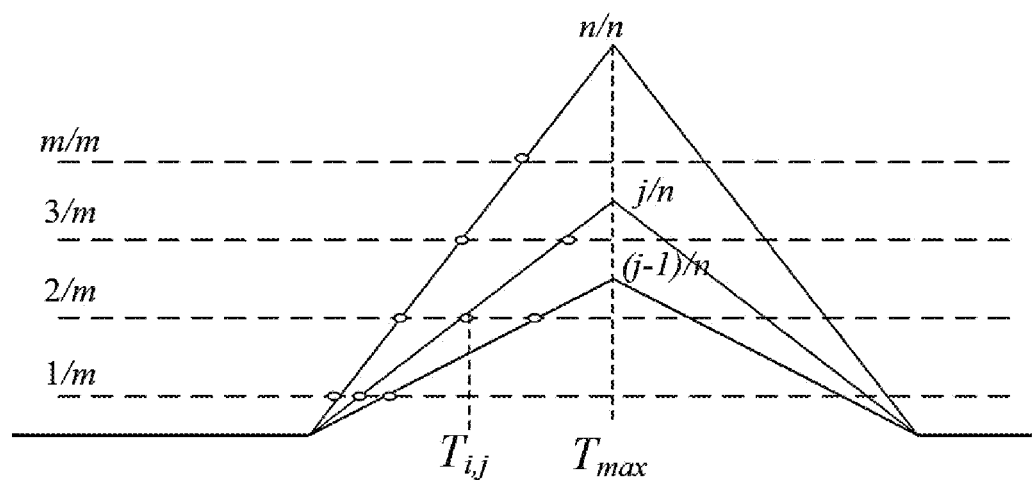
FIG. 4 is a schematic diagram of m first bisectrices and theoretical autocorrelation waveforms of n positioning signals provided by an embodiment.

FIG. 4 is a schematic diagram of m first bisectrices and theoretical autocorrelation waveforms of n positioning signals provided by an embodiment. As shown in FIG. 4, the front edge heights corresponding to the m first bisectrices are, from bottom to top, 1/m, 2/m, . . . , m/m; and the fading values corresponding to the theoretical autocorrelation waveforms of n positioning signals are, from top to bottom, n/n, (n−1)/n, . . . , 1/n. The moment corresponding to an intersection point between the $i^{th}$ (i=1, 2, . . . , m) first bisectrix and a front edge of an autocorrelation waveform having the $j^{th}$ (j=1, 2, . . . , n) fading value is denoted as $T_{i,j}$, and the moment corresponding to the maximum fading value is denoted as $T_{max}$. As shown in FIG. 4, there are multiple intersection points between the m first bisectrices and the front edges of the theoretical autocorrelation waveforms of the n positioning signals. By taking these intersection points as reference points, corresponding standard slopes and corresponding time of arrival correction values can be calculated, so as to obtain the time of arrival correction information, which can be stored in the form of a table.

At S240, a front edge slope corresponding to a front edge reference point of a correlation waveform of an actually received signal is calculated.

In this embodiment, for an actually received signal, some front edge reference points are selected, for example, intersection points on a front edge are obtained by equally dividing the modulus of a correlation waveform of the actually received signal into m parts, and the front edge slopes at these intersection points are calculated. The rule for selecting the front edge reference points of the actually received signal is consistent with the rule for selecting the reference points of the theoretical autocorrelation waveforms of the positioning signals, so that the actually received signal is corrected to be closer to a theoretical autocorrelation waveform. The matching degree between correction information and the actually received signal is higher, thus improving the precision of time of arrival detection.

At S250, target correction information is found in the time of arrival correction information according to each front edge slope, and the target correction information includes a standard slope corresponding to each front edge slope and a time of arrival correction value corresponding to each standard slope.

The time of arrival correction information includes multiple standard slopes and corresponding time of arrival correction values. According to a front edge slope of an actually received waveform, it is possible to find a standard slope closest to the front edge slope in the time of arrival correction information, and read a corresponding time of arrival correction value. Taking equal dividing of a correlation waveform of an actually received signal into m parts as an example, the number of front edge reference points is m, and the number of front edge slopes is m, which are respectively denoted as $k_r$ (r=1, 2, . . . , m), so there are also m pieces of target correction information found, which are standard slopes closest to $k_r$ and time of arrival correction values, respectively. The moments for the m front reference points can be corrected respectively by using the m time of arrival correction values.

At S260, candidate times of arrival corresponding to the front edge slopes are calculated according to the time of arrival correction values.

At S270, the time of arrival of the actually received signal is determined according to the candidate times of arrival.

In this embodiment, for m front edge reference points and m found time of arrival correction values, m corrected times of arrival, that is, candidate times of arrival, are sequentially obtained. The candidate times of arrival are clustered, averaged, etc., so that candidate times of arrival corresponding to a cluster with the earliest time (i.e. the moment has a minimum value) can be taken as the time of arrival of the actually received signal.

In an embodiment, the autocorrelation waveforms of the normalized positioning signals are autocorrelation waveforms normalized according to the moduli; the maximum value of the maximum modulus of the theoretical autocorrelation waveforms of the n positioning signals is 1, and the minimum value is 1/n; and m and n are negatively correlated with the time of arrival correction precision, respectively.

In this embodiment, according to a requirement for the precision of time of arrival measurement (the minimum error of the time of arrival measurement), for the theoretical autocorrelation waveforms of the normalized positioning signals, the front edge heights are equally divided into m parts and the fading values are equally divided into n parts. A larger m indicates a higher precision and a smaller minimum error of the time of arrival measurement; and a larger n indicates a higher precision and a smaller minimum error of the time of arrival measurement, so that pieces of correction information about various positions on the front edges are comprehensively and carefully considered, thus improving the precision of correction of an actually received waveform. According to the precision requirement, the values of m and n may be determined by simulation.

In some embodiments, it is also possible to perform dividing and select reference points on the theoretical autocorrelation waveforms having various fading values according to other rules, not necessarily in a manner of equally dividing the front edge heights. For example, according to a statistical law of amplitude, a front edge portion which is steep (the change rate of the front edge height is high) or has a large amplitude may be divided into more segments, and more reference points are determined so as to obtain more dense and accurate standard slopes and time of arrival correction values; and for a front edge portion which is gentle (the change rate of the front edge height is low) or has a small amplitude, fewer reference points may be selected, which simplifies the calculation to a certain extent.

In an embodiment, the time of arrival correction information includes standard slopes and time of arrival correction values.

S230 includes:

S231: standard slopes corresponding to intersection points between the first bisectrices and the front edges of the theoretical autocorrelation waveforms of the positioning signals, are calculated; and S232: time of arrival correction values corresponding to the standard slopes are determined according to differences between the moment corresponding to the maximum modulus of the autocorrelation waveforms of the normalized positioning signals and the moments corresponding to the intersection points.

In this embodiment, the time of arrival correction information includes standard slopes and time of arrival correction values. A standard slope corresponding to an intersection point between the $i^{th}$ (i=1, 2, ..., m) first bisectrix and a theoretical autocorrelation waveform of a positioning signal having the $j^{th}$ (j=1, 2, ..., n) fading value is denoted as $k_{i,j}$, and a corresponding time of arrival correction value is denoted as $\alpha_{i,j}$, so the basis for generating the time of arrival correction information is as follows:

$$k_{i,j} = \frac{1}{L}\sum_{\Delta c=1}^{L} \frac{D_{T_{i,j+\Delta c}} - D_{T_{i,j}}}{\Delta c},$$

$i \in (1, m]$, $j \in (1, n]$ $\alpha_{i,j} = T_{max} - T_{i,j}$, $i \in (1, m]$, $j \in (1, n]$ where $k_{i,j}$ is a standard slope entry, $\alpha_{i,j}$ is a time of arrival correction value, $T_{max}$ is a moment corresponding to the maximum modulus of the autocorrelation waveforms, $T_{i,j}$ is a time value corresponding to a data point of which the maximum modulus of an autocorrelation function is j/n and the front edge height is i/m, $D_{T_{i,j}}$ is data of a theoretical autocorrelation function at time $T_{i,j}$, $D_{T_{i,j+\Delta c}}$ is data of the theoretical autocorrelation function at time $T_{i,j+\Delta c}$, $\Delta c$ is a time difference between adjacent data points, at $T_{i,j}$, on the theoretical autocorrelation function waveform, and L is the range of adjacent points used to calculate the slope, for example, L=5. By determining a time of arrival correction value based on a moment corresponding to the maximum modulus, the moment at each intersection point plus a certain correction value is closer to the moment at the maximum modulus. By applying this correction value to an actually received waveform, the accuracy of correction of the actually received waveform can be improved, and the detection precision is improved.

Table 1 Time of arrival correction information generated according to m first bisectrices and theoretical autocorrelation waveforms of n positioning signals

| Front edge heights | Fading values | | | | |
|---|---|---|---|---|---|
| | $N_1 = 1/n$ | $N_2 = 2/n$ | ... $N_j = j/n$ | ... | $N_n = n/n$ |
| $M_1 = 1/m$ | $k_{1,1} \alpha_{1,1}$ | $k_{1,2} \alpha_{1,2}$ | ... $k_{1,j} \alpha_{1,j}$ | ... | $k_{1,n} \alpha_{1,n}$ |
| $M_2 = 2/m$ | $k_{2,1} \alpha_{2,1}$ | $k_{2,2} \alpha_{2,2}$ | ... $k_{2,j} \alpha_{2,j}$ | ... | $k_{2,n} \alpha_{2,n}$ |
| ... | ... | ... | ... | ... | ... |
| $M_i = i/m$ | $k_{i,1} \alpha_{i,1}$ | $k_{i,2} \alpha_{i,2}$ | ... $k_{i,j} \alpha_{i,j}$ | ... | $k_{i,n} \alpha_{i,n}$ |
| ... | ... | ... | ... | ... | ... |
| $M_m = m/m$ | $k_{m,1} \alpha_{m,1}$ | $k_{m,2} \alpha_{m,2}$ | ... $k_{m,j} \alpha_{m,j}$ | ... | $k_{m,n} \alpha_{m,n}$ |

Table 1 shows the time of arrival correction information generated according to m first bisectrices and theoretical autocorrelation waveforms of n positioning signals. As shown in Table 1, the time of arrival correction information is stored in the form of a table. The time of arrival correction table may be a two-dimensional table, with n fading values on the horizontal axis and m front edge heights on the vertical axis. Entries include standard slopes and time of arrival correction values. Time of arrival correction information corresponding to the $i^{th}$ first bisectrix and a theoretical autocorrelation waveform of a positioning signal having the $j^{th}$ fading value includes a standard slope $k_{i,j}$ and a time of arrival correction value $\alpha_{i,j}$.

In an embodiment, S240 includes:

S241: a front edge height of a correlation waveform of an actually received signal is equally divided into m parts to obtain m second bisectrices;

S242: m front edge reference points are determined according to intersection points between the m second bisectrices and the front edge of the correlation waveform of the actually received signal; and S243: front edge slopes corresponding to the front edge reference points are calculated respectively.

In this embodiment, the front edge height of the correlation waveform of the actually received signal is equally divided into m parts to obtain m second bisectrices. In this embodiment, the rule for selecting the front edge reference points of the actually received signal is consistent with the rule for selecting the reference points of the theoretical autocorrelation waveforms of the positioning signals, so that the actually received signal is corrected to be closer to a theoretical autocorrelation waveform. The matching degree between correction information and the actually received signal is higher, thus improving the precision of time of arrival detection.

For the convenience of calculation, the correlation waveform of the actually received signal is normalized, so the height of each divided part is 1/m, and the corresponding amplitudes of the second bisectrices sequentially are 1/m, 2/m, ..., m/m. An intersection point between each second bisectrix and the front edge of the correlation waveform is a front edge reference point, and there are m reference points in total, corresponding to m front edge slopes respectively. The front edge slope corresponding to each front edge reference point is denoted as $k_r$ (r=1, 2, ..., m). The basis for calculating the front edge slope $k_r$ for each front edge reference point (with its nearby adjacent points) is as follows:

$$k_r = \frac{1}{L}\sum_{\Delta c=1}^{L} \frac{R_{T_r} - R_{T_r+\Delta c}}{\Delta c},$$

where $R_T$ is data at an intersection point corresponding to the $r^{th}$ second bisectrix, $R_{T_r+\Delta c}$ is received correlation waveform data separated from the intersection point by a time $\Delta c$, and $T_r$ is a corresponding moment at the intersection point.

In an embodiment, the correlation waveform of the actually received signal is a correlation waveform normalized according to the modulus.

In this embodiment, a mathematical correlation operation is performed between an actually received signal and a transmission sequence stored locally in a signal receiving device to obtain a correlation waveform of the actually received signal, and a normalized autocorrelation waveform can be obtained by dividing the entire correlation waveform by the maximum modulus.

In some embodiments, it is also possible to select front edge reference points on an actually received waveform according to other rules, not necessarily in a manner of equally dividing the front edge height. For example, according to a statistical law of amplitude, a front edge portion which is steep (the change rate of the front edge height is high) or has a large amplitude may be divided into more segments, and more front edge reference points are determined so as to perform more precise correction; and for a front edge portion which is gentle (the change rate of the front edge height is low) or has a small amplitude, fewer reference points may be selected, which simplifies the calculation to a certain extent.

In an embodiment, step 250 includes:

taking, for each of the front edge slopes, a standard slope closest to said front edge slope in the time of arrival correction information as a standard slope corresponding to said front edge slope, and reading a corresponding time of arrival correction value; and searching, for each front edge slope, denoted as $k_r$, time of arrival correction information (denoted as $\Omega$) to obtain a standard slope closest to $k_r$ in the entries: $k_{r,i,j}=\min(|k_{i,j}-k_r|)$, $k_{i,j} \in \Omega$, where a corresponding $\alpha_{i,j}$ is a time of arrival correction value corresponding to the found entry closest to $k_r$.

In an embodiment, step 260 includes:

taking the sum of an actual time corresponding to each of the front edge slopes and a corresponding time of arrival correction value as candidate time of arrival corresponding to said front edge slope.

In this embodiment, an actual moment at an intersection point between the $r^{th}$ second bisectrix and the correlation waveform of the actually received signal is denoted as $T_r$, and a corresponding corrected candidate time of arrival may be denoted as $TOA_r=T_r+\alpha_{i,j}$.

In an embodiment, S270 includes:

S271: clusters of the candidate times of arrival are established according to cluster discrimination thresholds, each cluster including at least one candidate time of arrival; and S272: the time of arrival of the actually received signal are determined according to a cluster with the minimum candidate time of arrival.

In an embodiment, in a case where the difference between any two candidate times of arrival in x candidate times of arrival is less than or equal to a cluster discrimination threshold, the x candidate times of arrival belong to one cluster, where x is an integer greater than or equal to 2.

In this embodiment, the basis for establishing clusters is as follows: for any $TOA_i$ and $TOA_j$, $i,j \in [1,m]$, if: $|TOA_i-TOA_j| \leq Z$, then $TOA_i$ and $TOA_j$ belong to one cluster, where Z is the cluster discrimination threshold, which can be determined by simulation. The value of Z can be determined according to the measurement precision requirement of the time of arrival.

In an embodiment, S272 includes:

the average of the candidate times of arrival corresponding to each of the clusters is calculated, and the minimum average is taken as the time of arrival of the actually received signal.

In this embodiment, the average of the candidate times of arrival is calculated for each cluster as the candidate TOA of the cluster, and the smallest cluster refers to a cluster with the minimum candidate TOA. For all candidate TOAs of the clusters, the minimum candidate TOA is taken as the earliest time of arrival of the signal. In some embodiments, the cluster with the minimum candidate time of arrival may also be taken as the smallest cluster, and the average of various candidate times of arrival corresponding to the smallest cluster may be taken as the time of arrival.

Hereinafter, single-path signals and multipath signals are respectively taken as examples to illustrate the time of arrival detection process.

Example I: Determining Time of Arrival Based on Front Edge Slope Detection for Single-path Signals Parameter setting: the positioning signals transmitted by a base station are positioning reference signals ($PRS_S$) of the 3rd generation partnership project (3GPP) standard; the main parameters include a bandwidth of 100 M; the physical cell identifier (PCI) is 1; the sampling period is $T_S$=8 ns; and the oversampling multiple is 30. For a single-path signal, a correlation operation between an actually received signal and a local signal is performed at a receiving end, to obtain a correlation waveform.

1) The positioning signals are normalized, and for theoretical autocorrelation waveforms of the normalized positioning signals, the front edge heights are equally dividedd into 10 parts, and the fading values are equally divided into 20 parts, to generate time of arrival correction information. Table 2 is a generated time of arrival correction information table. As shown in Table 2, the correction table includes standard slopes and time of arrival correction values corresponding to different front edge heights and fading values.

TABLE 2

Time of arrival correction information table

| Front edge heights (M = 10) | Fading values (N = 20) | | | | | | |
|---|---|---|---|---|---|---|---|
| | $N_1$ = 1/20 | $N_2$ = 2/20 | $N_3$ = 3/20 | $N_4$ = 4/20 | ... | $N_j$ = j/20 ... | $N_{20}$ = 20/20 |
| $M_1$ = 1/m | / | $k_{1,2}$ = 0 $\alpha_{1,2}$ = 0 | $k_{1,3}$ = 0.0016 $\alpha_{1,3}$ = 45 | $k_{1,4}$ = 0.0019 $\alpha_{1,4}$ = 62 | ... | $k_{1,j}$ $\alpha_{1,j}$ | ... $k_{1,20}$ = 0.0071 $\alpha_{1,n}$ = 109 |

TABLE 2-continued

Time of arrival correction information table

| Front edge heights | Fading values (N = 20) | | | | | |
|---|---|---|---|---|---|---|
| (M = 10) | $N_1 = 1/20$ | $N_2 = 2/20$ | $N_3 = 3/20$ | $N_4 = 4/20$ | ... $N_j = j/20$ ... | $N_{20} = 20/20$ |
| $M_2 = 2/m$ | / | / | / | $K_{2,4} = 0$ $\alpha_{2,4} = 0$ | ... $k_{2,j}$ $\alpha_{2,j}$ | ... $k_{2,20} = 0.0083$ $\alpha_{2,n} = 96$ |
| ... | ... | ... | / | / | ... ... | ... ... |
| $M_i = i/m$ | / | / | / | / | ... $k_{i,j}$ $\alpha_{i,j}$ | ... $k_{i,20}$, $\alpha_{i,20}$ |
| ... | ... | ... | / | / | ... ... | ... ... |
| $M_{10} = 10/10$ | / | / | / | / | ... $k_{10,j}$ $\alpha_{10,j}$ | ... $k_{10,20} = 0$ $\alpha_{10,20} = 0$ |

Figure 5:
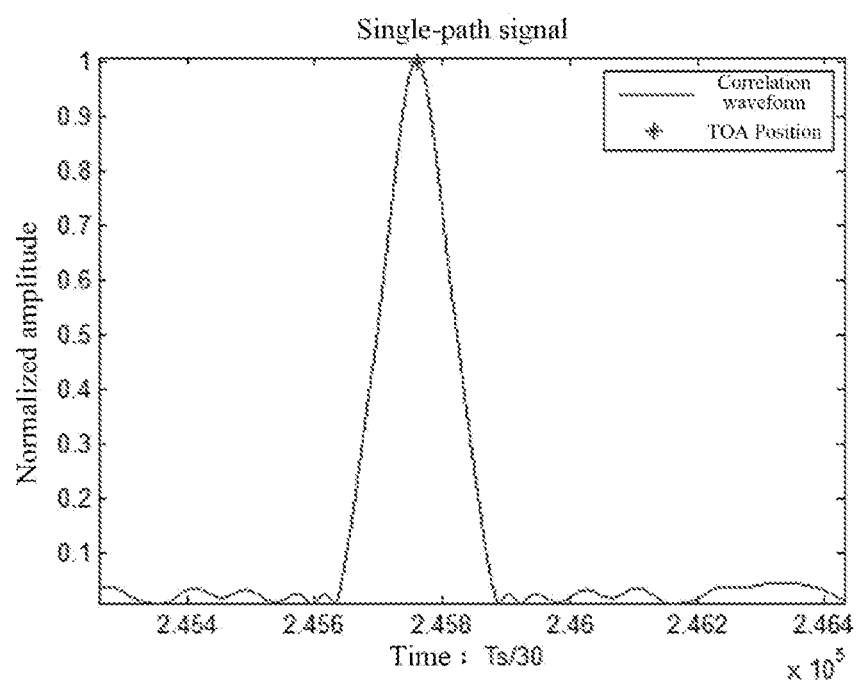
FIG. 5 is a schematic diagram of front edge slope detection of a single-path signal provided by an embodiment.

2) The front edge slopes of the correlation waveform of the actually received signal are calculated. FIG. 5 is a schematic diagram of front edge slope detection of a single-path signal provided by an embodiment. When an actually received signal is a single-path signal, there is no multipath effect, and its correlation waveform is shown as in FIG. 5. The front edge height of the correlation waveform is equally divided into 10 parts, and the front edge slope at an intersection point between each bisectrix and the front edge is calculated. There are 10 front edge slopes in total, denoted as $k_r$ (r=1, 2, . . . , 10).

3) The time of arrival correction table is searched for each front edge slope $k_r$ to determine target correction information, including finding a standard slope $k_{r,i,j}$ closest to $k_r$ in Table 2, and reading a corresponding time of arrival correction value. For example, in FIG. 5, a front edge slope of a front edge reference point at a front edge height of 1/m (m=10) is k1, and a standard slope closest to k1 in Table 2 is $k_{1,20}$=0.0071, and then the read corresponding time of arrival correction value is $\alpha_{1,n}$=109. The table is searched in this way for each front edge slope $k_r$ (r=1, 2, . . . , 10), and a total of 10 time of arrival correction values are obtained, which are respectively $\alpha_{i,j}$ (i=1, 2, . . . , 10): {109, 96, 84, 73, 62, 52, 42, 33, 22, 0}.

4) The moment corresponding to each of the front edge reference points is corrected according to the target correction information. In the correlation waveform shown in FIG. 5, original moments $T_r$ (i=1, 2, . . . , 10) corresponding to the front edge reference points are respectively: {245651, 245664, 245676, 245687, 245698, 245708, 245718, 245727, 245738, 245760}, so according to $T_r+\tau_{i,j}$, 10 corrected candidate times of arrival are obtained respectively, and the candidate times of arrival are respectively: {245760, 245760, 245760, 245760, 245760, 245760, 245760, 245760, 245760, 245760}.

5) The candidate times of arrival are clustered, and the cluster discrimination threshold is set to be Z=5. Since the difference between any two of the above candidate times of arrival is less than 5, the above candidate times of arrival belong to a same cluster. This is because the single-path signal is not affected by multipath transmission, and its correlation waveform is closer to an ideal state. The error and fluctuation between the candidate times of arrival are also small. The average of the candidate times of arrival in this cluster is 245760, that is, the final measured TOA is 245760, and the unit for the above time is $T_s/30$.

Example II: Determining Time of Arrival Based on Front Edge Slope Detection for Multipath Signals Parameter setting: the positioning signals transmitted by a base station are PRS signals of the 3GPP standard; the main parameters include a bandwidth of 100 M; the physical cell identifier (PCI) is 1; the sampling period is $T_s$=8 ns; and the oversampling multiple is 30. In this example, a multipath channel with two paths is constructed. The first path is attenuated by 0.5, the second path has no attenuation, and the delay is 100 ($T_s/30$).

1) The positioning signals are normalized, and the theoretical autocorrelation waveforms of the normalized positioning signals are equally divided into 10 parts by the front edge heights, and into 20 parts by the fading values, to generate time of arrival correction information, with reference to Table 2.

Figure 6:
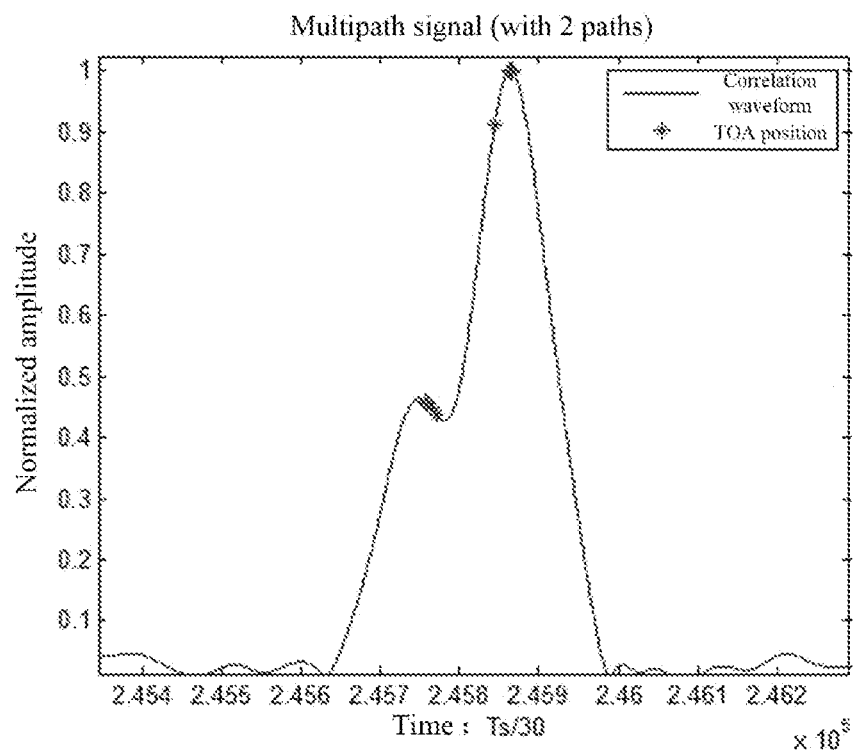
FIG. 6 is a schematic diagram of front edge slope detection of a multipath signal provided by an embodiment.

2) The front edge slopes of the correlation waveform of the actually received signal are calculated. FIG. 6 is a schematic diagram of front edge slope detection of a multipath signal provided by an embodiment. When an actually received signal is a multipath signal, a correlation waveform obtained after a correlation operation between the signal and a local signal is shown as in FIG. 6. The front edge height of the correlation waveform is equally divided into 10 parts, and the front edge slope at an intersection point between each bisectrix and the front edge is calculated. There are 10 front edge slopes in total, denoted as $k_r$ (r=1, 2, . . . , 10).

3) The time of arrival correction table is searched for each front edge slope $k_r$ to determine target correction information, including finding a standard slope $k_{i,j}$ closest to $k_r$ in Table 2, and reading a corresponding time of arrival correction value. There are 10 time of arrival correction values in total, which are respectively $\alpha_{i,j}$(i=1, 2, . . . , 10): {94, 77, 66, 33, 41, 52, 42, 33, 22, 0}.

4) The moment corresponding to each of the front edge reference points is corrected according to the target correction information. In the correlation waveform shown in FIG. 6, original moments $T_r$ (i=1, 2, . . . , 10) corresponding to the front edge reference points are respectively: {245664, 245686, 245705, 245723, 245803, 245814, 245824, 245833, 245843, 245864}, so according to $T_r+\tau_{i,j}$, 10 corrected candidate times of arrival are obtained respectively, and the candidate times of arrival are respectively: {245758, 245763, 245771, 245756, 245844, 245866, 45866, 245866, 245865, 245864}.

5) The candidate times of arrival are clustered, and the cluster discrimination threshold is set to be Z=5 to obtain the smallest cluster of {245756, 245758}. The average of the candidate times of arrival in this cluster is 245757, that is, the final measured TOA is 245757, and the unit for the above time is $T_s/30$.

In the method for determining time of arrival of the above embodiments, the theoretical autocorrelation waveforms of the positioning signals and the correlation waveform of the actually received signal are normalized and equally divided to determine the reference points, so that the correlation between corresponding positions of the theoretical autocorrelation waveforms and the correlation waveform of the actually received signal is determined. The theoretical standard slopes and the time of arrival correction values are used to correct the moments of the front edge reference points of the actually received signal. On this basis, the time of arrival is determined according to the smallest cluster, which can significantly reduce the influence of the bandwidth signal on the slope detection, refine details of front edge change of the autocorrelation signal in the multipath environment and improve the detection precision.

Figure 7:
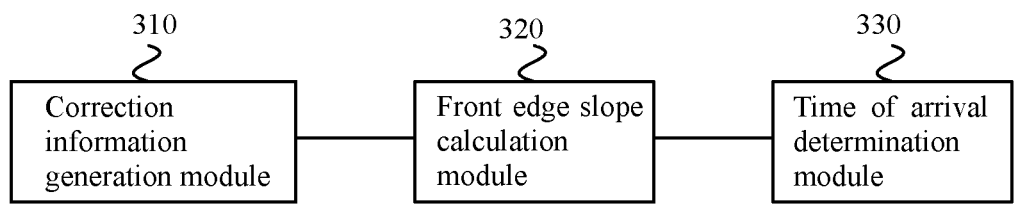
FIG. 7 is a schematic structural diagram of an apparatus for determining time of arrival provided by an embodiment.

An embodiment of the present disclosure further provides an apparatus for determining time of arrival. FIG. 7 is a schematic structural diagram of an apparatus for determining time of arrival provided by an embodiment. As shown in FIG. 7, the apparatus for determining the time of arrival includes: a correction information generation module 310, a front edge slope calculation module 320 and a time of arrival determination module 330.

The correction information generation module 310 is configured to generate time of arrival correction information according to front edge information of theoretical autocorrelation waveforms of positioning signals having different fading values. The front edge slope calculation module 320 is configured to calculate a front edge slope corresponding to a front edge reference point of a correlation waveform of an actually received signal. The time of arrival determination module 330 is configured to determine target correction information from the time of arrival correction information according to the front edge slope, and determine the time of arrival of the actually received signal based on the target correction information.

In the apparatus for determining the time of arrival of this embodiment, time of arrival correction information is generated according to theoretical autocorrelation waveforms of positioning signals, and the moments for some front edge positions of an actually received signal are corrected according to theoretical time of arrival correction information. In this way, in a multipath or noise environment, details of front edge change of a correlation waveform of the actually received signal can be noticed, so that the detection result of the front edge slope of the actually received signal is closer to a theoretical waveform, thereby improving the precision and reliability of the time of arrival detection.

In an embodiment, the correction information generation module 310 includes a first equal dividing unit.

The first equal dividing unit is configured to equally divide the fading values of the autocorrelation waveforms of the normalized positioning signals into n parts, to obtain theoretical autocorrelation waveforms of n positioning signals corresponding to different fading values; a second equal dividing unit configured to equally divide the front edge heights of the autocorrelation waveforms of the normalized positioning signals into m parts, to obtain m first bisectrices; and a correction unit configured to generate, according to the m first bisectrices and the theoretical autocorrelation waveforms of then positioning signals, the time of arrival correction information, where m and n are both integers greater than 2.

In an embodiment, the time of arrival correction information includes standard slopes and time of arrival correction values. The correction unit includes a first calculation subunit.

The first calculation subunit configured to calculate standard slopes corresponding to intersection points between the first bisectrices and the front edges of the theoretical autocorrelation waveforms of the positioning signals; a second calculation subunit configured to determine time of arrival correction values corresponding to the standard slopes according to differences between the moment corresponding to the maximum modulus of the autocorrelation waveforms of the normalized positioning signals and the moments corresponding to the intersection points.

In an embodiment, the front edge slope calculation module 320 includes a third equal dividing unit.

The third equal dividing unit configured to equally divide the front edge height of the correlation waveform of the actually received signal into m parts, to obtain m second bisectrices; a reference point determination unit configured to determine m front edge reference points according to intersection points between the m second bisectrices and the front edge of the correlation waveform of the actually received signal; and a slope calculation module configured to calculate front edge slopes corresponding to the front edge reference points respectively.

In an embodiment, the time of arrival determination module 330 includes a search unit.

The search unit configured to search for target correction information in the time of arrival correction information according to each of the front edge slopes, where the target correction information includes a standard slope corresponding to each of the front edge slopes and a time of arrival correction value corresponding to each of the standard slopes; a candidate time calculation unit configured to calculate candidate time of arrival corresponding to each of the front edge slopes according to each of the time of arrival correction values; and a time of arrival determination unit configured to determine the time of arrival of the actually received signal according to each of the candidate times of arrival.

In an embodiment, the search unit is configured to:
take, for each of the front edge slopes, a standard slope closest to said front edge slope in the time of arrival correction information as a standard slope corresponding to said front edge slope, and read a corresponding time of arrival correction value.

In an embodiment, the candidate time calculation unit is configured to:
take the sum of an actual time corresponding to each of the front edge slopes and a corresponding time of arrival correction value as candidate time of arrival corresponding to said front edge slope.

In an embodiment, the time of arrival determination unit includes a clustering subunit.

The clustering subunit configured to establish clusters of the candidate times of arrival according to cluster discrimination thresholds, each cluster including at least one candidate time of arrival; and a time determination subunit configured to determine the time of arrival of the actually received signal according to a cluster with the minimum candidate time of arrival.

In an embodiment, the time determination subunit is configured to:
take the average of the candidate times of arrival in the cluster with the minimum candidate time of arrival as the time of arrival of the actually received signal.

In an embodiment, in a case where the difference between any two candidate times of arrival in x candidate times of arrival is less than or equal to a cluster discrimination threshold, the x candidate times of arrival belong to one cluster, where x is an integer greater than or equal to 2.

In an embodiment, the autocorrelation waveforms of the normalized positioning signals are autocorrelation waveforms normalized according to the moduli; the maximum value of the maximum modulus of the theoretical autocorrelation waveforms of the n positioning signals is 1, and the minimum value is 1/n; and m and n are negatively correlated with the time of arrival correction precision, respectively.

In an embodiment, the correlation waveform of the actually received signal is a correlation waveform normalized according to the modulus.

The apparatus for determining time of arrival proposed in this embodiment and the method for determining time of arrival proposed in the above-mentioned embodiments belong to the same application concept. Technical details not described in detail in this embodiment can be found in any of the above-mentioned embodiments, and this embodiment has the same beneficial effect as performing the method for determining time of arrival.

An embodiment of the present disclosure further provides a signal receiving device. The method for determining time of arrival may be performed by the apparatus for determining time of arrival, which may be implemented in software and/or hardware and integrated in the signal receiving device.

Figure 8:
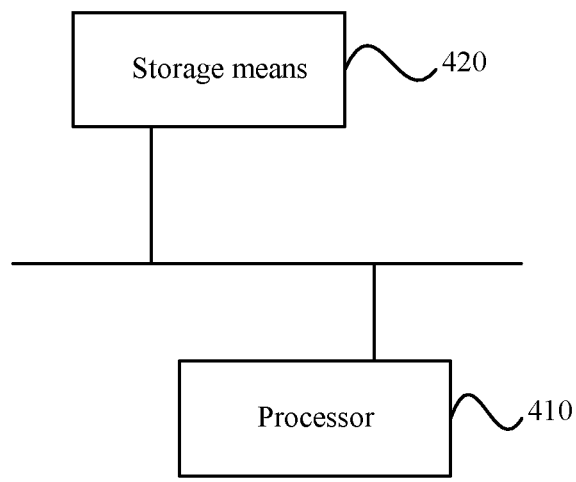
FIG. 8 is a schematic diagram of a hardware structure of a signal receiving device provided by an embodiment.

FIG. 8 is a schematic diagram of a hardware structure of a signal receiving device provided by an embodiment. As shown in FIG. 8, a signal receiving device provided in this embodiment includes a processor 410 and a storage means 420. There may be one or more processors in the signal receiving device, and one processor 410 is taken as an example in FIG. 8. The processor(s) 410 and the storage means 420 in the device may be connected by a bus or in other ways, and the bus connection is taken as an example in FIG. 8.

One or more programs are executed by the one or more processors 410, thus causing the one or more processors to carry out the method for determining the time of arrival described in any one of the above embodiments.

As a computer-readable storage medium, the storage means 420 of the signal receiving device may be used to store one or more programs, which may be software programs, computer-executable programs and modules, such as program instructions/modules (e.g., modules in the apparatus for determining the time of arrival shown in FIG. 7, including a correction information generation module 310, a front edge slope calculation module 320 and a time of arrival determination module 330) corresponding to the method for determining the time of arrival in the embodiments of the present disclosure. The processor 410 runs the software programs, instructions, and modules stored in the storage means 420, thus implementing various functional applications and data processing of the signal receiving device, i.e., implementing the method for determining the time of arrival in the above method embodiments.

The storage means 420 mainly includes a program storage region and a data storage region. The program storage region may store an operating system, an application program required for at least one function. The data storage region may store data created with the use of the device, etc. (such as time of arrival correction information, front edge slope, etc. in the above embodiments). Additionally, the storage means 420 may include a high-speed random access memory, and may also include a non-volatile memory, such as at least one magnetic disk memory device, flash memory device, or other non-volatile solid state memory device. In some instances, the storage means 420 may include a memory provided remotely from the processor 410. Such remote memories may be connected to the signal receiving device over a network. Instances of the above-mentioned networks include, but are not limited to, the Internet, an intranet, a local area network, a mobile communication network, and combinations thereof.

Also, when one or more programs contained in the signal receiving device are executed by the one or more processors 410, the following operations are performed: generating time of arrival correction information according to front edge information of theoretical autocorrelation waveforms of positioning signals having different fading values; calculating a front edge slope corresponding to a front edge reference point of a correlation waveform of an actually received signal; and determining target correction information from the time of arrival correction information according to the front edge slope, and determining the time of arrival of the actually received signal based on the target correction information.

The signal receiving device proposed in this embodiment and the method for determining time of arrival proposed in the above-mentioned embodiments belong to the same application concept. Technical details not described in detail in this embodiment can be found in any of the above-mentioned embodiments, and this embodiment has the same beneficial effect as performing the method for determining time of arrival.

An embodiment of the present disclosure further provides a non-transitory storage medium containing computer-executable instructions, which, when executed by a computer processor, cause to carry out a method for determining time of arrival, the method including: generating time of arrival correction information according to front edge information of theoretical autocorrelation waveforms of positioning signals having different fading values; calculating a front edge slope corresponding to a front edge reference point of a correlation waveform of an actually received signal; and determining target correction information from the time of arrival correction information according to the front edge slope, and determining the time of arrival of the actually received signal based on the target correction information.

From the above description of the implementations, the present disclosure may be implemented by software and general-purpose hardware, and may also be implemented by hardware. Based on such understanding, the technical scheme of the present disclosure may be embodied in the form of a software product. The computer software product may be stored in a computer-readable storage medium, such as a floppy disk, a read-only memory (ROM), a random access memory (RAM), a flash memory (FLASH), a hard disk or an optical disk of a computer, etc., including several instructions to make the computer device (which may be a personal computer, a server, a network device, or the like) to carry out the methods described in any of the embodiments of the present disclosure.

The block diagrams of any logic flow in the drawings of the present disclosure may represent procedure steps, or may represent interconnected logic circuits, modules and functions, or may represent a combination of procedure steps and logic circuits, modules and functions. Computer programs may be stored in a memory. The memory may be of any type suitable for a local technical environment and may be implemented using any suitable data storage technology, such as but not limited to, a read only memory (ROM), a random access memory (RAM), an optical memory apparatus and system (digital video disc (DVD) or compact disk (CD)), etc. The computer-readable medium may include a non-transitory storage medium. The data processor may be of any type suitable for a local technical environment, such as but not limited to a general-purpose computer, a specialpurpose computer, a microprocessor, a digital signal processor (DSP), an application specific integrated circuit (ASIC), a field-programmable gate array (FPGA) and a processor based on a multi-core processor architecture.

What is claimed is:

1. A method for determining time of arrival, applied to a signal receiving device in a wireless communication system, comprising:
receiving positioning signals having different fading values from a base station in the wireless communication system,
generating time of arrival correction information according to front edge information of theoretical autocorrelation waveforms of the positioning signals having different fading values;
calculating a front edge slope corresponding to a front edge reference point of a correlation waveform of an actually received signal; and
determining target correction information from the time of arrival correction information according to the front edge slope, and determining the time of arrival of the actually received signal based on the target correction information.

2. The method of claim 1, wherein, generating time of arrival correction information according to front edge information of theoretical autocorrelation waveforms of the positioning signals having different fading values, comprises:
equally dividing autocorrelation waveforms of normalized positioning signals into n parts by fading values, to obtain theoretical autocorrelation waveforms of n positioning signals corresponding to different fading values;
equally dividing front edge heights of the autocorrelation waveforms of the normalized positioning signals into m parts to obtain m first bisectrices; and
generating the time of arrival correction information according to the m first bisectrices and the theoretical autocorrelation waveforms of the n positioning signals, wherein m and n are both integers greater than 2.

3. The method of claim 2, wherein the time of arrival correction information comprises standard slopes and time of arrival correction values; and
generating the time of arrival correction information according to the m first bisectrices and the theoretical autocorrelation waveforms of the n positioning signals, comprises:
calculating standard slopes corresponding to a plurality of intersection points between the m first bisectrices and the front edges of the theoretical autocorrelation waveforms of the n positioning signals; and
determining, according to the difference between a moment corresponding to a maximum modulus of the autocorrelation waveforms of the normalized positioning signals and a moment corresponding to each of the intersection points, a time of arrival correction value corresponding to the standard slope of the intersection point.

4. The method of claim 2, wherein the calculating the front edge slope corresponding to the front edge reference point of the correlation waveform of the actually received signal comprises:
equally dividing a front edge height of the correlation waveform of the actually received signal into m parts, to obtain m second bisectrices;
determining m front edge reference points according to intersection points between the m second bisectrices and the front edge of the correlation waveform of the actually received signal; and
calculating front edge slopes corresponding to the m front edge reference points respectively.

5. The method of claim 4, wherein the determining target correction information from the time of arrival correction information according to the front edge slope, and determining the time of arrival of the actually received signal based on the target correction information comprises:
searching for the target correction information in the time of arrival correction information according to each front edge slope, wherein the target correction information comprises a standard slope corresponding to the front edge slope and a time of arrival correction value corresponding to the standard slope;
calculating candidate time of arrival corresponding to the front edge slope according to the time of arrival correction value; and
determining the time of arrival of the actually received signal according to m candidate times of arrival.

6. The method of claim 5, wherein, searching for the target correction information in the time of arrival correction information according to each front edge slope comprises:
taking, for each front edge slope, a standard slope closest to the front edge slope in the time of arrival correction information as a standard slope corresponding to the front edge slope, and reading a time of arrival correction value corresponding to the closest standard slope.

7. The method of claim 5, wherein, calculating candidate time of arrival corresponding to the front edge slope according to the time of arrival correction value, comprises:
taking the sum of an actual time corresponding to the front edge slope and a corresponding time of arrival correction value as candidate time of arrival corresponding to the front edge slope.

8. The method of claim 5, wherein, determining the time of arrival of the actually received signal according to m candidate times of arrival, comprises:
establishing clusters of the m candidate times of arrival according to cluster discrimination thresholds, each cluster including at least one candidate time of arrival; and
determining the time of arrival of the actually received signal according to a cluster with the minimum candidate time of arrival.

9. The method of claim 8, wherein, determining the time of arrival of the actually received signal according to a cluster with the minimum candidate time of arrival, comprises:
calculating the average of the candidate times of arrival corresponding to each of the clusters, and taking the minimum average as the time of arrival of the actually received signal.

10. The method of claim 8, wherein in a case where the difference between every two candidate times of arrival in x candidate times of arrival is less than or equal to a cluster discrimination threshold, the x candidate times of arrival belong to one cluster, wherein x is an integer greater than or equal to 2.

11. The method of claim 2, wherein the autocorrelation waveforms of the normalized positioning signals are autocorrelation waveforms normalized by modulus; and
the maximum value of the maximum modulus of the theoretical autocorrelation waveform of each positioning signal is 1, and the minimum value is $1/n$,
where m and n are negatively correlated with the time of arrival correction precision, respectively.

12. The method of claim 1, wherein the correlation waveform of the actually received signal is a correlation waveform normalized by modulus.

13. A signal receiving device, comprising:
- at least one processor; and
- a storage means, configured to store at least one program which, when executed by the at least one processor, cause the at least one processor to carry out the method for determining time of arrival of claim 1.

14. A non-transitory computer-readable storage medium, storing computer programs which, when executed by a processor, cause the processor to carry out a method for determining time of arrival applied to a signal receiving device in a wireless communication system, the method comprising:
- receiving positioning signals having different fading values from a base station in the wireless communication system,
- generating time of arrival correction information according to front edge information of theoretical autocorrelation waveforms of the positioning signals having different fading values;
- calculating a front edge slope corresponding to a front edge reference point of a correlation waveform of an actually received signal; and
- determining target correction information from the time of arrival correction information according to the front edge slope, and determining the time of arrival of the actually received signal based on the target correction information.

* * * * *